US006427162B1

(12) United States Patent
Mohamed (10) Patent No.: US 6,427,162 B1
(45) Date of Patent: Jul. 30, 2002

(54) SEPARATE CODE AND DATA CONTEXTS: AN ARCHITECTURAL APPROACH TO VIRTUAL TEXT SHARING

(75) Inventor: Ahmed Hassan Mohamed, Berkeley, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/643,047

(22) Filed: May 2, 1996

(51) Int. Cl.[7] ................................................ G06F 9/00
(52) U.S. Cl. ......................................................... 709/108
(58) Field of Search .............................. 395/678, 677; 711/207, 206, 203; 709/107, 108

(56) References Cited

U.S. PATENT DOCUMENTS

| | | | | |
|---|---|---|---|---|
| 4,761,733 A | * | 8/1988 | McCrocklin et al. | 364/200 |
| 4,985,828 A | * | 1/1991 | Shimizu et al. | 363/200 |
| 5,313,611 A | * | 5/1994 | Franklin et al. | 395/425 |
| 5,437,017 A | * | 7/1995 | Ikegaya et al. | 395/400 |
| 5,630,087 A | * | 5/1997 | Talluri et al. | 395/412 |
| 5,638,382 A | * | 6/1997 | Krick et al. | 371/22.5 |
| 5,727,179 A | * | 3/1998 | Dei | 395/416 |
| 5,754,818 A | * | 5/1998 | Mohamed | 395/417 |
| 5,893,122 A | * | 4/1999 | Tabuchi | 707/501 |

FOREIGN PATENT DOCUMENTS

| | | |
|---|---|---|
| EP | 196244 | 10/1986 |
| EP | 282213 | 9/1988 |
| EP | 327798 A | 8/1989 |

OTHER PUBLICATIONS

M. N. Nelson, "Virtual Memory for the Sprite Operating System", pp. 1–26, Jan. 1993.*
J. B. Chen, et al, "A Simulation Based Study of TLB Performance", ACM, pp. 114–123, 1992.*
K. Shirriff, "An Implementation of Memory Sharing and File Mapping", Master's Report, Jan. 1993.*

M. J. Bach, The Design of the UNIX Operating System, Prentice Hall, pp. 152–156, 1990.*

Y. A. Khakidi, "Improving the Address Translation Performance of Widely Shared pages", Sun Microsystems Laboratories, Inc., Feb. 1995.*

Computer Society International Conference (COMPCON), Spring Meeting, Los Alamitos, Feb. 26–Mar. 2, 1990. Institute of Electrical and Electronics Engineers, pp. 264–269. "The 68040 On–Chip Memory Subsystem."

* cited by examiner

Primary Examiner—St. John Courtenay, III
Assistant Examiner—S. Lao
(74) Attorney, Agent, or Firm—Blakely Sokoloff Taylor & Zafman

(57) ABSTRACT

The present invention provides a processor including a core unit for processing requests from at least one process. The at least one process has a code portion with at least one segment having a first code context identifier. The at least one process also has a data portion with a first data context identifier. The processor further includes a first storage device for storing code address translations and a second storage device for storing data address translations. The processor also includes a code context register coupled to the core unit and to the first storage device, for storing a second code context register. The processor also includes a data context register, coupled to the core unit and to the second storage device for storing a second data context identifier.

6 Claims, 9 Drawing Sheets

SEPARATE CODE AND DATA CONTEXTS: AN ARCHITECTURAL APPROACH TO VIRTUAL TEXT SHARING

BACKGROUND OF THE INVENTION

1. Field of the Invention

The present invention generally relates to the field of computer systems. In particular, the present invention relates to memory management subsystems.

2. Description of the Related Art

A major concern for operating systems is managing memory allocation to various processes in view of the restricted amount of physical memory residing in the computer hardware. Designers must determine where a process will be placed in the main memory and how memory is allocated to the process as the process is modified during its execution. One problem common to all operating systems is determining how to handle memory addressing when memory becomes sparse. To address this problem, numerous operating systems have adopted virtual memory addressing.

Virtual memory addressing allows a programmer and the compilation system to choose addresses that are convenient to work with, with rather than those forced by the hardware architecture. This allows the operating system to run a program that requires more than the space available in the physical memory. As a process runs, it references code and data by using virtual addresses that are transparently translated to physical addresses. In order to run, a program must reside in physical memory and it must have a real address for both its code and data. A translation mechanism is thus needed to convert virtual memory addresses to physical memory addresses at run time. To map a virtual address to a physical memory address, a mapping function is used. The mapping function takes a virtual address and converts it into a physical address by using a predetermined address mapping.

Figure 1A:
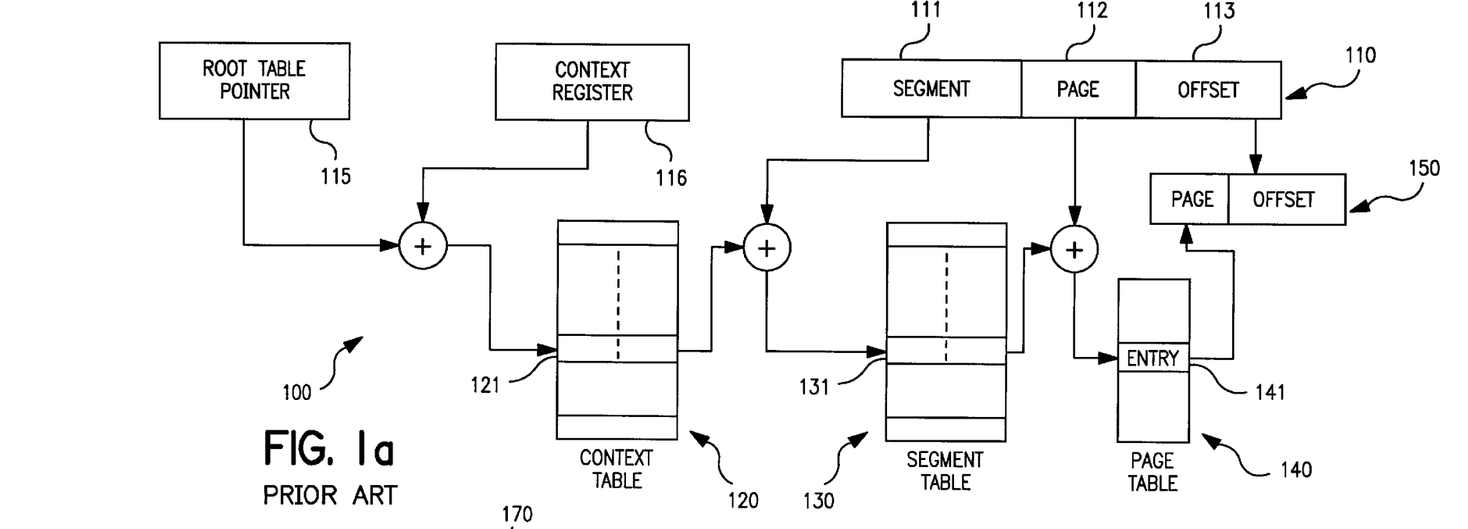
FIG. 1a illustrates a virtual to physical address translation mechanism.

In a non-limiting illustrative example, a virtual address includes three parts: a virtual segment number 111, a page number 112, and an offset 113 within that page as shown in the forwarded page table scheme illustrated in FIG. 1a. Virtual segment 111, virtual page 112, and offset 113 are converted to a physical page number (also referred to as the page frame number) and offset at run-time. Using a combination of software and hardware techniques, a virtual address is looked up in a segment table 130 and a page table 140 to generate a physical page number. The forwarded page table scheme 100 involves the translation of a virtual address 110 into a physical address 150 by successively accessing three distinct tables: a Context table 120, a Segment table 130 and a Page table 140. More specifically, the virtual address 110 is translated into the physical address 150 by first combining the contents of a processor register (i.e., Root Table pointer 115), set up during initialization of a memory management unit (MMU) and information within a Context register 116. The Context register 116 is a storage element (e.g., processor register) that stores information uniquely identifying processes that happen to possess the same virtual address. By combining the Root Table pointer 115 with the information of the Context register 116, a pointer to an entry 121 of the Context table 120 is produced. This entry 121 is used as an index for accessing the contents of an entry 131 in the Segment table 130. The entry 131 has its base address set by the contents of the Segment portion 111 of the virtual address 110. Likewise, the contents of the entry 131 are used as an index for the Page table 140, having a page portion 112 as its base address, in order to access the contents of a page entry 141. The contents of the page entry 141 is combined with a page offset 113 of the virtual address 110 to form the physical address 150.

Page tables, such as the ones shown in FIG. 1a, are data structures which are usually held in physical memory. Each time a virtual address is referenced, it must be looked up in this table to yield its corresponding physical address. However, searching this table every time the operating system needs a virtual page could be very time-consuming. The tables shown in FIG. 1a, in the alternative, can be more conveniently stored in an associative memory often built into a processor chip.

Figure 1B:
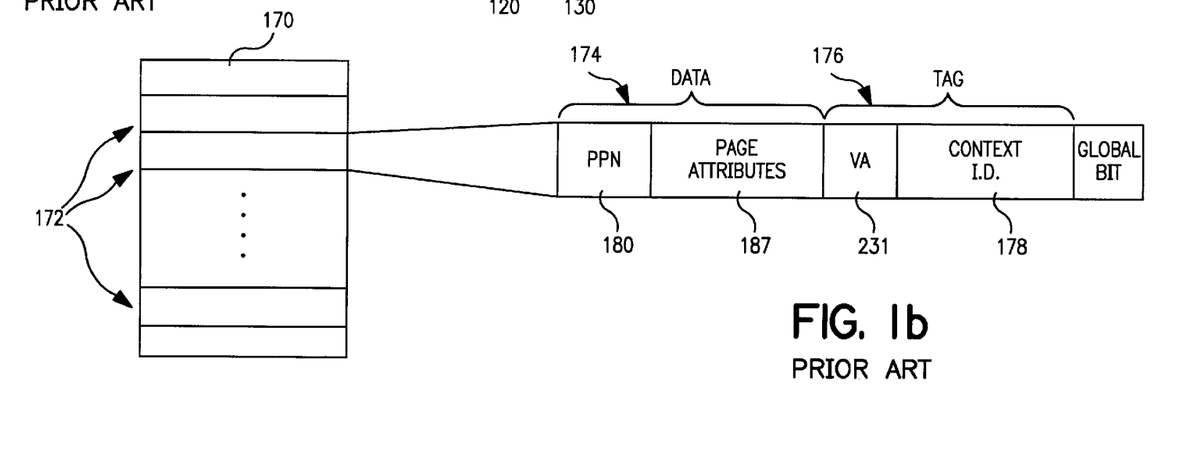
FIG. 1b illustrates a software-managed translation look-aside buffer.

An increasing number of architectures provide virtual memory support through software managed translation look-aside buffers (TLB). This is mainly due to the advent of 64-bit address pages which requires huge amounts of physical memory to hold the address translation page tables. A software managed TLB 170, shown in FIG. 1b, is a small associative cache of the most recent virtual to physical address translations and is managed by the operating system. The TLB 170 includes a number of translation entries 172 which include a data portion 174 and a tag portion 176. The tag portion 176 includes a virtual address and a process context identification ("Contex ID") 178 which uniquely identifies a process. The data portion 174 includes a physical page number 180 and page attributes (e.g., protection, reference, modify, etc.) 187. When a process references an address the processor looks up the virtual address in the TLB. If the virtual address is not found in the TLB, the execution of the currently running process is suspended and an exception is generated (fault or trap). An exception handler searches the page tables in the main memory to see if there is an entry corresponding to the virtual address that was not found in the cache associative memory. If one is found, then the translation information for this page is placed in the cache associative memory (TLB). The instruction that caused the TLB miss is then re-executed. The virtual address is thus looked up again in the TLB, but this time the virtual address is found in the TLB and is translated to the physical address which the processor can then access.

Figure 2:
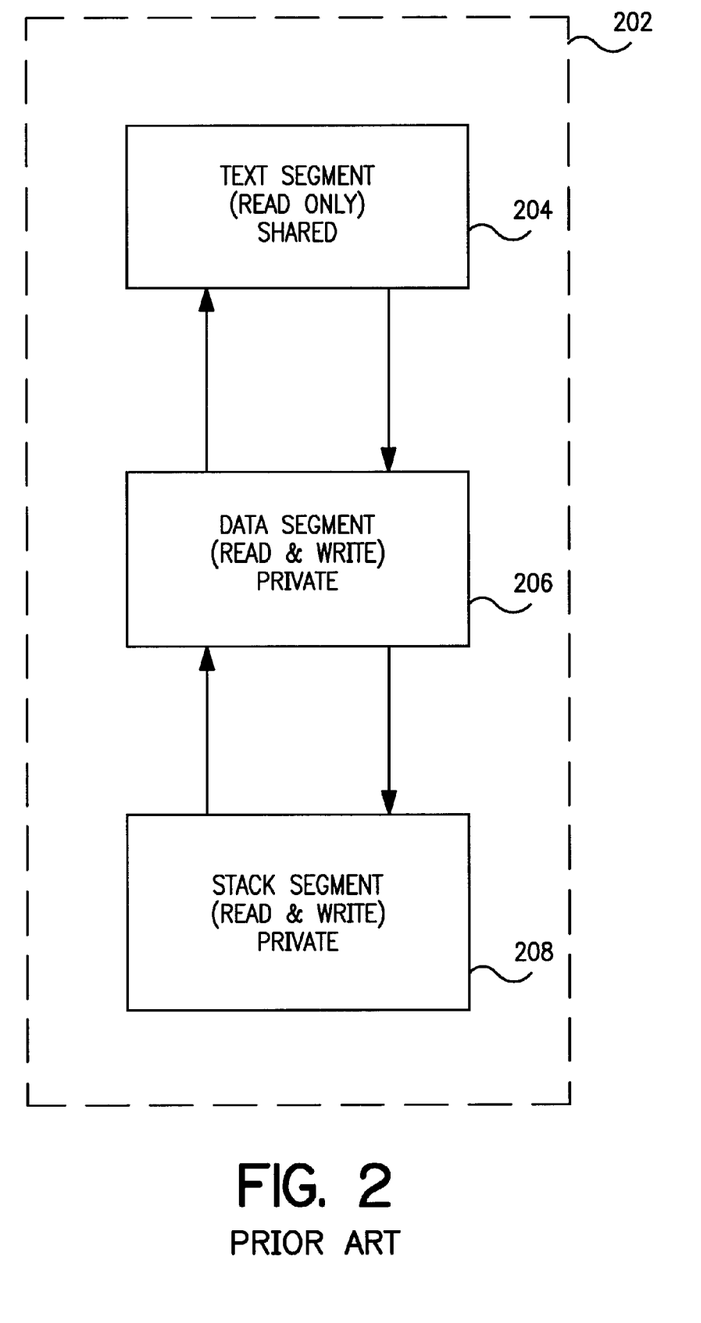
FIG. 2 illustrates a segmented processing configuration.

In Unix System V release 4, the address space of a process is divided into different sections called segments or regions. A segment is a continuous portion of the virtual address space. A segment provides a convenient method for allowing a process to share a portion of its address space with other processes. It also allows the operating system to protect the process 1 address space so that the process itself cannot alter it. FIG. 2 shows a process address space 202 including text segment 204, data segment 206 and stack segment 208. The text segment typically contains the executable code (or machine instructions) for a process. Generally this segment is marked read-only so that a process cannot alter its own code, or have it altered by other processes. A text segment can be shared among many processes that execute the same code. For example, there may be many users running a specific program at the same time. The operating system will place the code for the specific program in a text segment that is shared amongst all the processes executing it.

The data segment 206 holds the data used and modified by a process during its execution. A data segment is usually marked for read and write. However, the data segment is never shared with other processes but rather it remains private. If this segment was shareable then a process might inadvertently alter the data of another process. Finally the process address space 202 includes the stack segment 208 which contains the process stack. The stack segment 208 is marked read and write, and similarly to the data segment is not shared with other processes.

Figure 3:
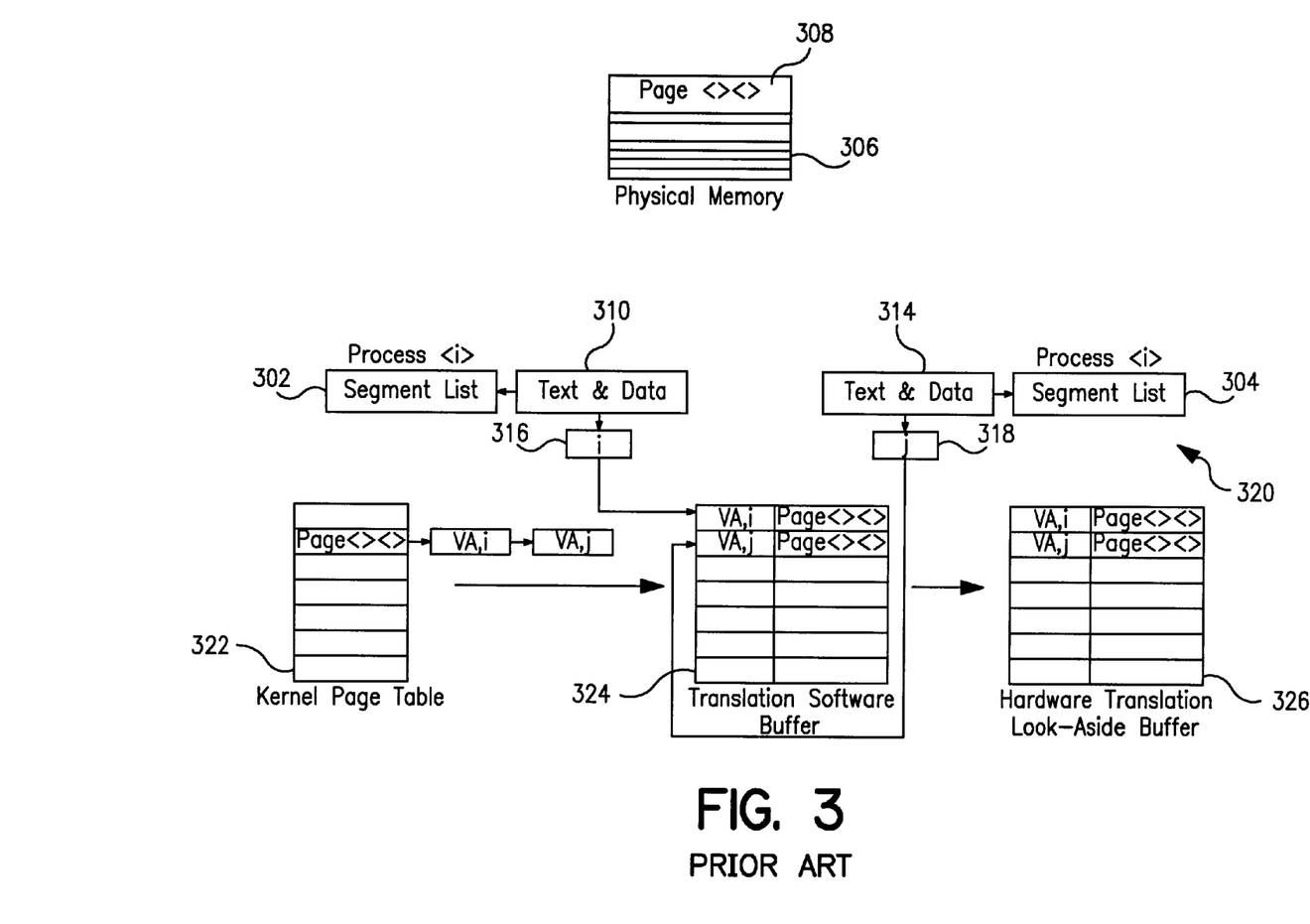
FIG. 3 illustrates translation data structures in connection with an object sharing scheme.

The shareability of the text segment of the process address space 202 is a particularly useful feature in time sharing and database systems where a large number of users are concurrently executing the same program. FIG. 3 illustrates two processes i and j, 303 respectively 304 having at least one segment 310 respectively 314 running the same program (object) included at the same location in the physical page 308 of physical memory 306. Physical memory 306 which includes the common object stored at page 308 is typically accessed by retrieving the virtual address VA, corresponding to the common object and looking up a translation key 316 respectively 318 which for each process includes a process identifier i, process i, and a identifier j for process j. The virtual address VA in conjunction with process identifier i and j are then looked up in one of the operating systems translation resources such as the kernel page table 322, the translation software buffer 324, or the hardware translation look-aside buffer 326. As one can see, both translation entries VA,i and VA,j map into the same physical page in all translation resources shown in FIG. 3. In this case, all the virtual translation resources 322, 324, and 326 substantially replicate the TLB entries (there are two entries for essentially the same information) even though each translation entry has the same translation information i.e., the virtual address and the corresponding physical page. Sharing common text objects, thus, results in substantial overhead in the translation resources. It is desirable to provide a mechanism which allows processes sharing common text objects to share the virtual translation resources without substantial overhead.

SUMMARY OF THE INVENTION

The present invention provides a processor including a core unit for processing requests from at least one process. The at least one process has a code portion with at least one segment having a first code context identifier. The at least one process also has a data portion with a first data context identifier. The processor further includes a first storage device for storing code address translations and a second storage device for storing data address translations. The processor also includes a code context register coupled to the core unit and to the first storage device, for storing a second code context register. The processor also includes a data context register, coupled to the core unit and to the second storage device for storing the second data context identifier.

The present invention also provides a computer system comprising a bus, a memory device coupled to the bus, and a processor coupled to the bus. The processor includes a core unit for processing requests from at least one process which has a code portion with at least one code segment. The at least one code segment has a first code context identifier. The at least one process further has a data portion with at least one data segment having a first data context identifier. The computer system also includes a first storage device for storing code address translations, a second storage device for storing data address translations, a code context register, coupled to the core unit and to the first storage device, for storing a second code context identifier. The computer system further includes a data context register, coupled to the core unit and to the second storage device for storing a second data context identifier.

The present invention also provides a computer-implemented method for sharing control address translation resources in a computer system including a processor having a code context register, a data context register, a code translation look-ahead buffer (CTLB), a data translation look-ahead buffer (DTLB), and a virtual address register. The computer-implemented method for sharing virtual address translation resources by a plurality of processes includes the following steps: mapping each of said processes, code and data segments into an address space; allocating for each of said processes a data sub-address space context identifier; determining whether a first process can share code segments with other processes having a common code sub-address space context identifier; if said first process can share code segments with said other processes, assigning said first process said common code sub-address space context identifier; if said process cannot share code segments with said other processes having a common code sub-address space context identifier, assigning said first process a unique code sub-address space context identifier.

BRIEF DESCRIPTION OF THE DRAWING

The features, aspects, and advantages of the present invention will become more fully apparent from the following Detailed Description, appended claims, and accompanying drawings in which:

DETAILED DESCRIPTION OF THE INVENTION

In the following description, specific elements or steps, procedures, command options, command items, and other specifics are set forth in order to provide a thorough understanding of the present invention. However, it will be apparent to one skilled in the art that the present invention may be practiced without these specific details. In other instances, well-known systems and methods are shown in diagrammatic block or flow diagram form to avoid order not to unnecessarily obscuring the present invention.

Figure 4:
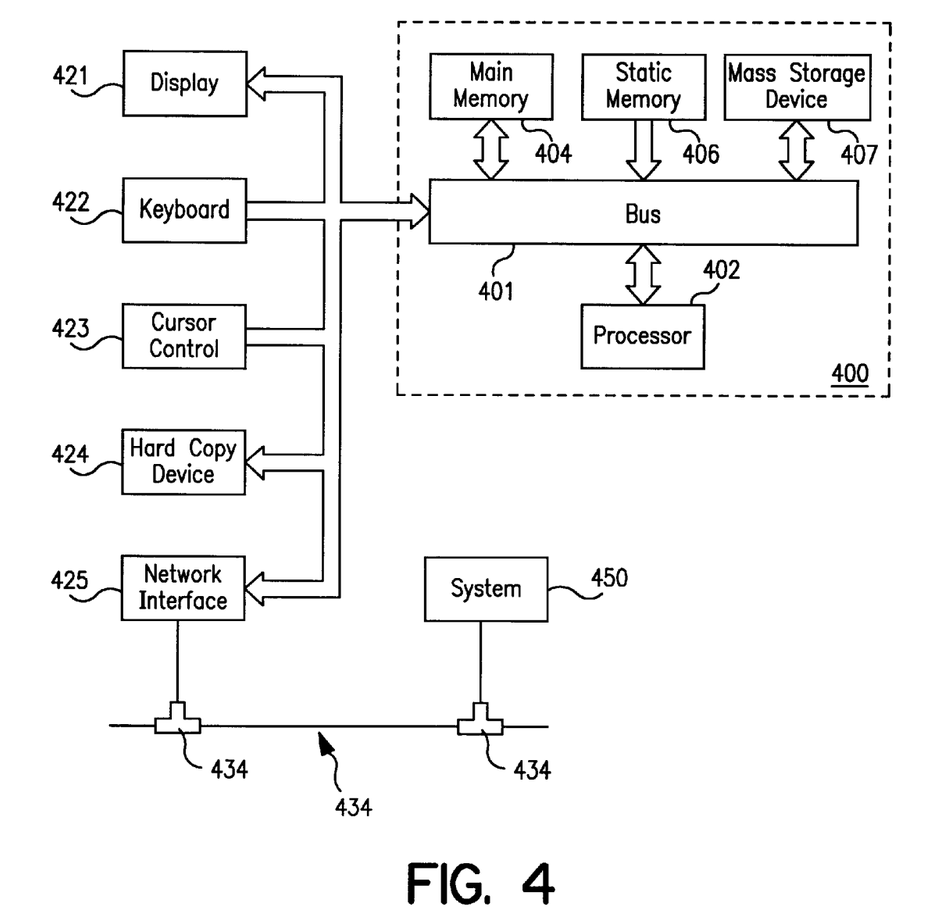
FIG. 4 illustrates a block diagram of a computer system incorporating the present invention.

Referring to FIG. 4, a block diagram for a computer system 400 incorporating the present invention is shown. The computer system 400 comprises a bus 401 for communicating information to other components of the computer system and a processor 402, coupled to bus 401, for processing information. System 400 further comprises a random access memory (RAM) or other dynamic storage device 404 (referred to as main memory), coupled to bus 401, for storing information and instructions to be executed by processor 402. Main memory 404 may also be used for storing temporary variables or other intermediate information during execution of instructions by processor 402. Computer system 400 also comprises a read only memory (ROM) and/or other static storage device 406 coupled to bus 401 for storing information and instructions for processor 402, and a mass storage device 407 such as a magnetic disk or optical disk and its corresponding disk drive. Mass storage device 407 is coupled to bus 401 for storing information and instructions. Computer system 400 may further be coupled to a display device 421, such as a cathode ray tube (CRT) or liquid crystal display (LCD) via bus 401, for displaying information to a computer user. Computer system 400 is also coupled to an alphanumeric input device 422, including a keyboard, for communicating information and command selections to processor 402. Direction information and command selections to processor 402 can be input via a cursor control device 423, such as a mouse, a trackball, stylus, or cursor direction keys, coupled to bus 401. Another device which may be coupled to bus 401 is hard copy device 424 which may be used for printing instructions, data, or other information on a medium such as paper, film, or similar types of media. System 400 is coupled to another system 450 via a network interface 425 and a communications link 434. While any or all of the components of system 400 and associated hardware may be used in a preferred embodiment, it can be appreciated by one skilled in the art that any other type of configuration of the system may be used for various purposes.

In the discussion presented herein, a "process" is defined as a sequence of operational steps performed by a processor which rely on address translation resources (i.e., assigned code, data, stack, shared library) for execution. Each process is assigned a unique context identifier.

Figure 5:
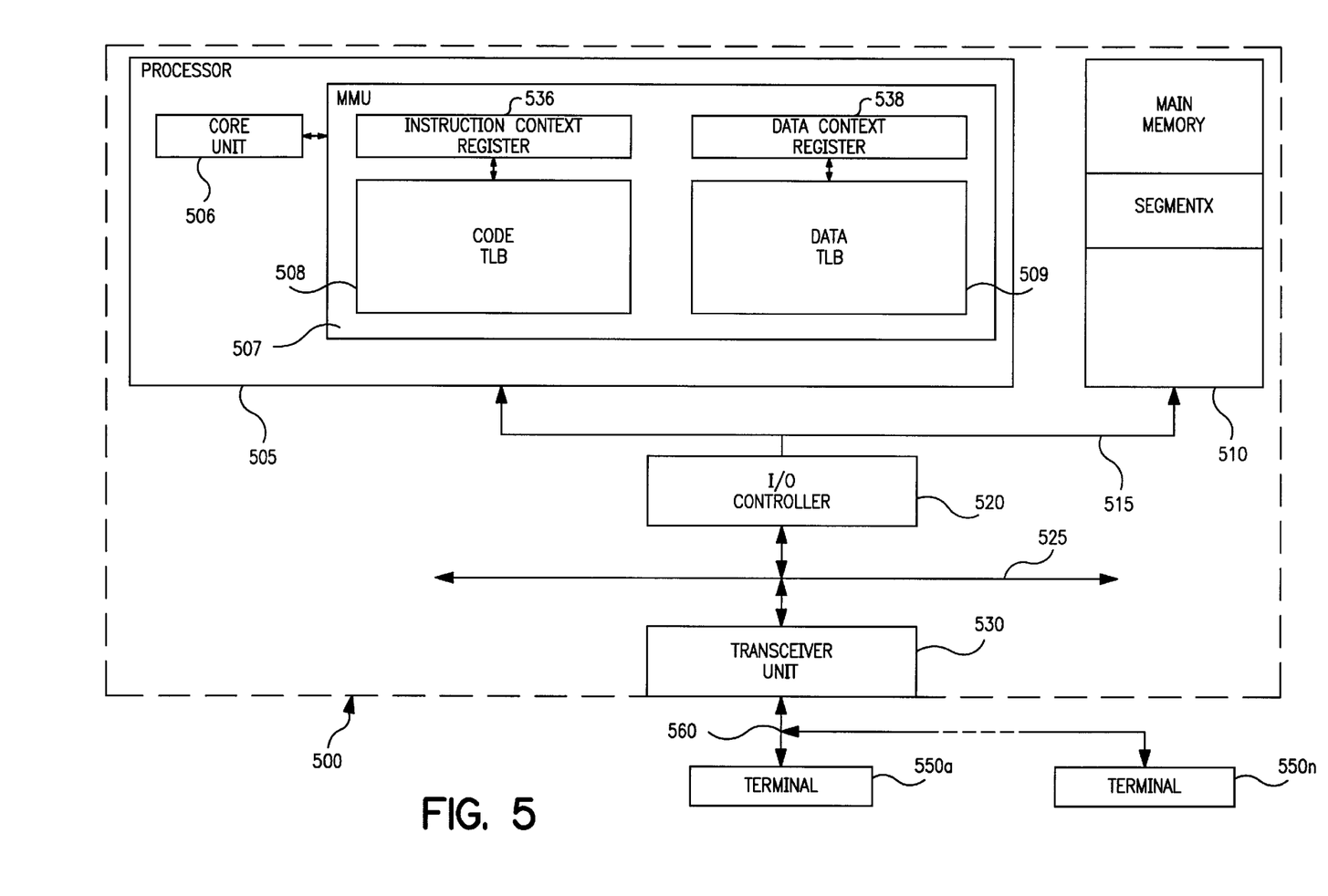
FIG. 5 illustrates in more detail a diagrammatic representation of a computer system employing the address translation architecture and process of the present invention.

FIG. 5 is a more detailed diagrammatic representation of a computer system 500 employing the addressing architecture and process of the present invention. The computer system 500 (shown in dotted line) is coupled to a plurality of terminals (e.g., personal computers, work stations, etc.) 550a–550n via communication link(s) 560. The computer system 500 comprises a processor 505 and main memory 510 coupled together through a first bus 515. The first bus 515 is coupled to an input/output controller 520 which provides a communication path between the first bus 515 and a second bus 525 (e.g., an I/O bus). The second bus 525 propagates information originating from one of the plurality of terminals 550a–550n received from a transceiver unit 530 (e.g., modem).

As further shown in FIG. 5, the processor 505 includes a core unit 506 and a memory management unit ("MMU") 507. The MMU 507 is used by the processor 505 to translate virtual addresses into physical addresses, when accessing information stored in main memory 510. The MMU 507 includes a first storage device for storing code address translations, hereinafter Code Translation Look-Aside Buffer (CTLB) 508. The MMU further includes a second storage device 505 for storing data address translations, hereinafter Data Translation Look-Aside Buffer (DTLB) 509. Moreover, the MMU includes instruction or code context register 536 coupled to the core unit 506 and to the CTLB 508 for storing a current code context identifier which uniquely identifies the code of a current process. The core unit 506 processes requests from at least one process. The process issuing requests to the core unit typically has a code address space with at least one segment. For each segment, a code context identifier is assigned. The process further has a data address space with a data context identifier. The MMU 507 further includes a data context register 538 coupled to the core unit 506 and to the DTLB 509 for storing a current data context identifier. By way of non-limiting example, code context register 536 is typically used for instruction fetches while the data context register is typically used for memory load and store access.

Figure 6:
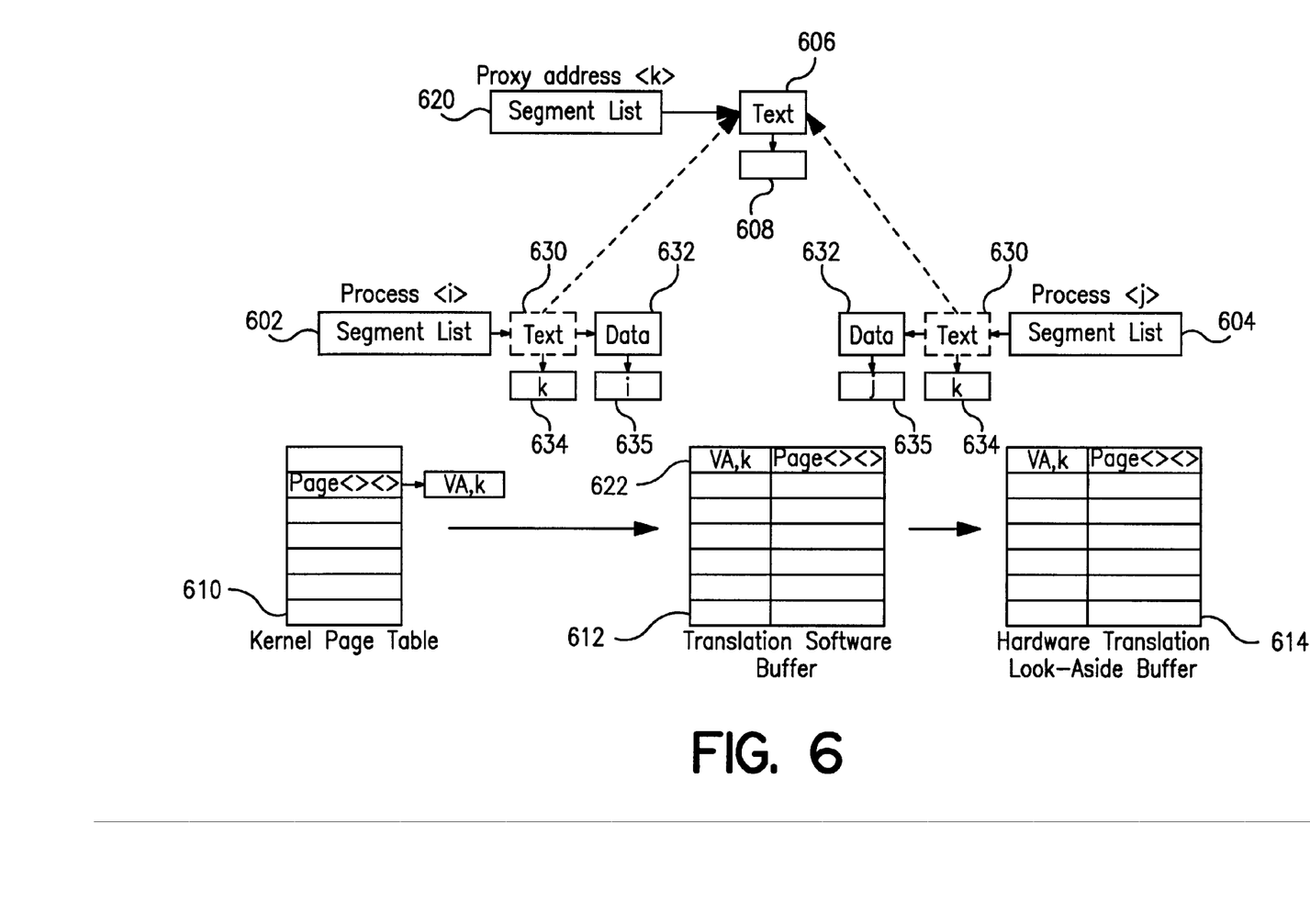
FIG. 6 illustrates two processes sharing the same entry in the translation resources according to the present invention.

FIG. 6 illustrates two processes i and j, according to the present invention, in conjunction with a number of virtual address translation resources 610, 612, and 614 according to the present invention. Processes i and j, in this particular example, share a same text object, i.e., common code located in a physical memory at page X. The shared text object is mapped at the same virtual address VA in each process address space. Each process in the system has, for each segment, a data portion 632 with a sub-address space for data and a different code portion 630 with a different code sub-address space for code (text). The system assigns, for each segment of code, a unique code context identifier 634 and for each segment of data a unique data context identifier 635 different from the code context identifier. The address translation architecture, according to the present invention, with the two separate context registers, code context register 536 and data context register 538 shown in FIG. 5, allows processes sharing text objects (common code) to share one single translation entry in the address translation resources while still maintaining their own private data objects. The processor uses two different context identifiers, i.e., code and data context identifiers for each process based on the type of operation to perform: for instruction fetches a code context identifier is used while for register and memory load/store accesses, a data context identifier is used. Processes sharing the same sub-address space (object sharing) will also share the same context identifier. FIG. 6 shows the code segments 630 for processes i and j as code segment 606 for process 620, each of which shares the same code context identifier K (608) This code context identifier is different from the context identifiers i and j 635 assigned to the data segments 632 of the i respectively j processes.

The separation between the context identifiers for code and data allows for providing a single translation entry 622 for processes such as 602 and 604 which share a common object. As long as the segments of various processes sharing the same common object will have the same context identifier K, only one translation entry 622 appears in the translation tables shown in FIG. 6, instead of a multiplicity of translations for each separate process such as shown in FIG. 3. The data sub-address spaces for processes i and j, however, are assigned different context identifiers i, respectively, j. In this manner, one process will not inadvertently access and modify the data of another process with which it may share the same virtual address $V_A$ and the same code context identifier K.

Figure 7:
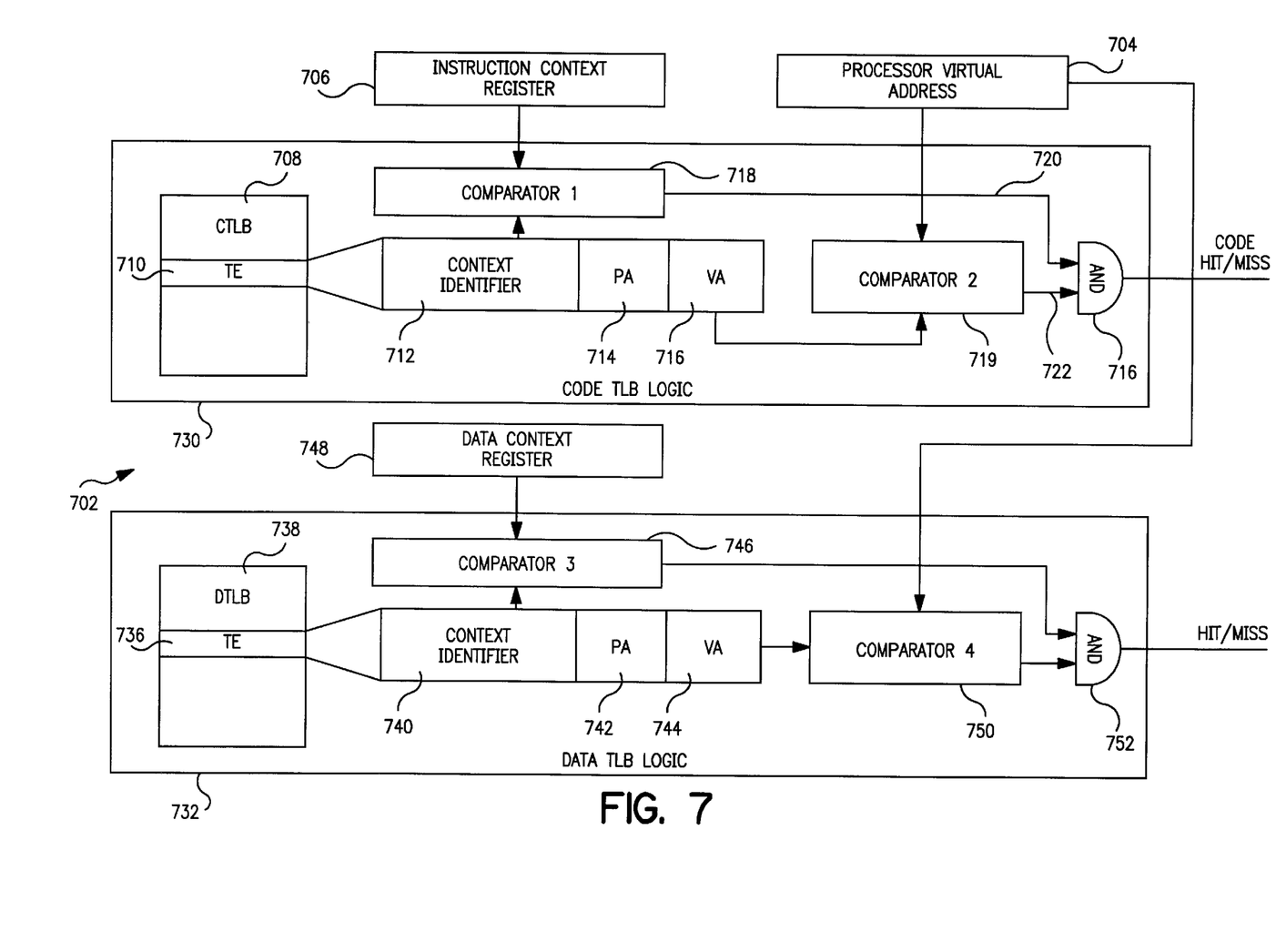
FIG. 7 illustrates in more detail the address translation architecture according to the present invention.

FIG. 7 illustrates a more detailed block diagram of the address translation architecture in accordance to the present invention. The Memory Management Unit (MMU) 702 includes a code context register 706, processor virtual address register 704, and data context register 748. The MMU 702 also includes code TLB logic 730 and data TLB logic 732. The code TLB logic includes a code TLB 708 while the data TLB logic includes a data TLB 738. The code TLB 708 includes at least one translation entry 710 containing a context identifier information 712, a physical address 714, and a virtual address 716. The virtual address is mapped into the physical address 714.

The core unit (not shown) generates a current virtual address and loads the virtual address into the processor's virtual address register 704. The MMU, particularly an address translation control circuitry, performs a physical address lookup in which it utilizes the current virtual address stored in register 704 and current context information, i.e., current context identifier, residing in code context register 706 to ascertain whether translation information for a predetermined (current) virtual address is stored in the code TLB 708. The operating system scans the code TLB 708 for entries including both the current context identifier stored in code context register 706 and the current virtual address stored in the processor's virtual address register 704. A first comparing unit 718, located in the code TLB logic 730, compares the content of the code context register 706 with the context identifier 712. If the context identifier 712 is identical with the current context identifier stored in register 706, the comparing unit 718 generates a signal 720 to an input of AND gate 716. The code TLB logic 730 includes a second comparing unit 719 which compares the current virtual address stored in the processor's virtual address register 704 with the virtual address 716 in the scanned translation entry 710. If the current virtual address is identical with the virtual address in the translation entry 710, the comparing unit 719 generates a second signal 722 to a second input of the AND gate 716. The AND gate 716 then generates a code hit signal if both the context identifiers and the virtual addresses found in the translation entry coincide with the current context identifier and the current virtual address. The code TLB logic 730 outputs the code "Hit" signal and then passes the physical address 714 to the core unit (not shown).

Otherwise, if the virtual address and the code context identifier are not found in the TLB 708, the MMU generates a trap and transmits a translation "Miss" signal to the core unit. Thereafter, the operating system software performs a lookup of the kernel page table, typically stored in the main memory, containing all virtual-to-physical address translations to obtain the physical address which is provided to the processor. The operating system also copies into the code TLB 708 the entry including the current code context identifier and the current virtual address.

FIG. 7 also shows data TLB logic 732 in conjunction with the data context register 748 and the processor virtual address register 704. For data, which is considered private and thus not shareable, the operating system will assign a different context identifier. In other words, two processes such as i and j shown in FIG. 6 have the context identifiers i, respectively, j for the data sub-address space. Accordingly, for data, there will be separate translation entries 736 in the data translation look-aside buffer 738 for different processes. The separate translation entries 736 contain a context identifier information 740, a physical address 742, and a virtual address 744 mapped into the physical address 742. The mechanism of translation for addresses referencing data information is similar to the one explained above in conjunction with code information. The processor will scan the data translation look-aside buffer 738 for data entries 736 including both the current virtual address and the current context identifier included in the processor virtual address register 704 and the data context register 748, respectively. In case both the current virtual address and the current data context identifier are found in one single entry of the DTLB 738, the comparing units 746 and 750 will generate two signals at logic level one. These signals are gated to the AND gate 752 which in response generates a data hit signal if both input signals are high.

Figure 8:
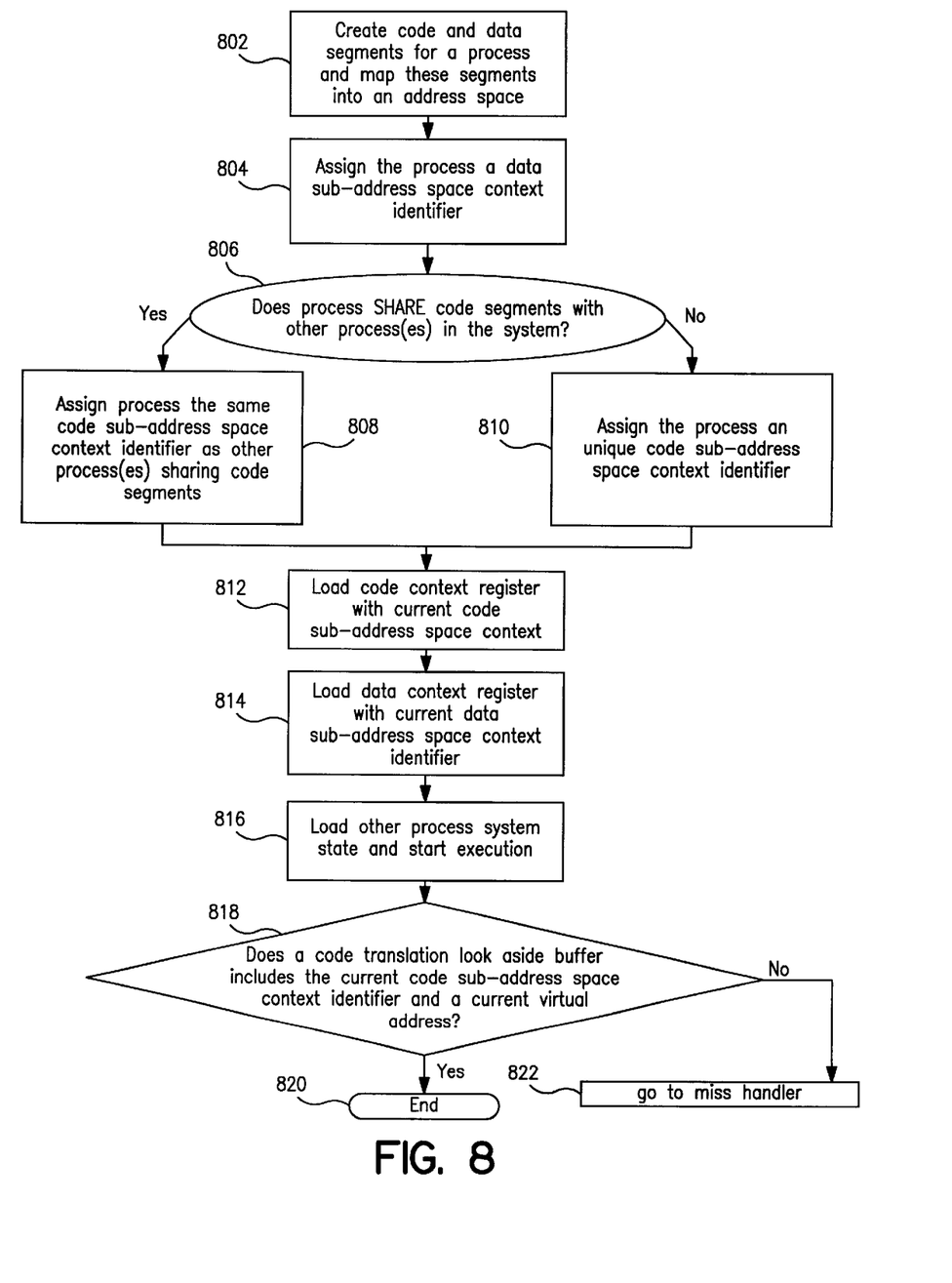
FIG.8 illustrates a flowchart diagram for the process of sharing virtual address translation resources according to the present invention.

FIG. 8 illustrates a flowchart diagram for a process (method) of sharing virtual address translation resources context identifiers in a computer system implementing the sharing of translation resources explained in the foregoing description. The method starts at block 802 where the system creates code and data segments for a process and maps the code and data segments into an address space available, assigning the code and data segments virtual addresses. The method then continues at block 804 where it allocates the respective process data sub-address space context identifier. The method continues and passes to decision block 806 where the system determines whether the process shares code segments with other processes in the system. If it is determined that the process shares code segments with other processes in the system, the method passes to block 808 where the system assigns the process the same (common) code sub-address space context identifier as other processes sharing code segments. However, if the process does not share code segments with other processes in the system, a new unique code sub-address space context identifier is assigned to the process at block 810. Note that while several processes in the system can share the same code sub-address space context identifier, these processes have a separate data sub-address space context identifier.

At block 812, the code context register is loaded with a current code sub-address space context identifier. At block 814, the data context register is loaded with current data sub-address space context identifier. At block 816, the process loads other process system state such as program counter, general purpose registers, and stack pointer and starts execution. From there the process passes to decision block 818 where the system determines whether the code translation look-aside buffer (CTLB) has an entry including the current code sub-address space context identifier and the current virtual address. If such is the case, the method according to the present invention generates a code hit signal. Also at this block, the system provides to a core unit the physical address corresponding to the current virtual address found in the CTLB. The process then ends at block 820. However, if the code translation look-aside buffer does not have an entry including the current context identifier and the current virtual address the system generates a trap and transmits a "Miss" signal to the core unit. The method then passes to a translation miss handler at block 822.

Figure 9:
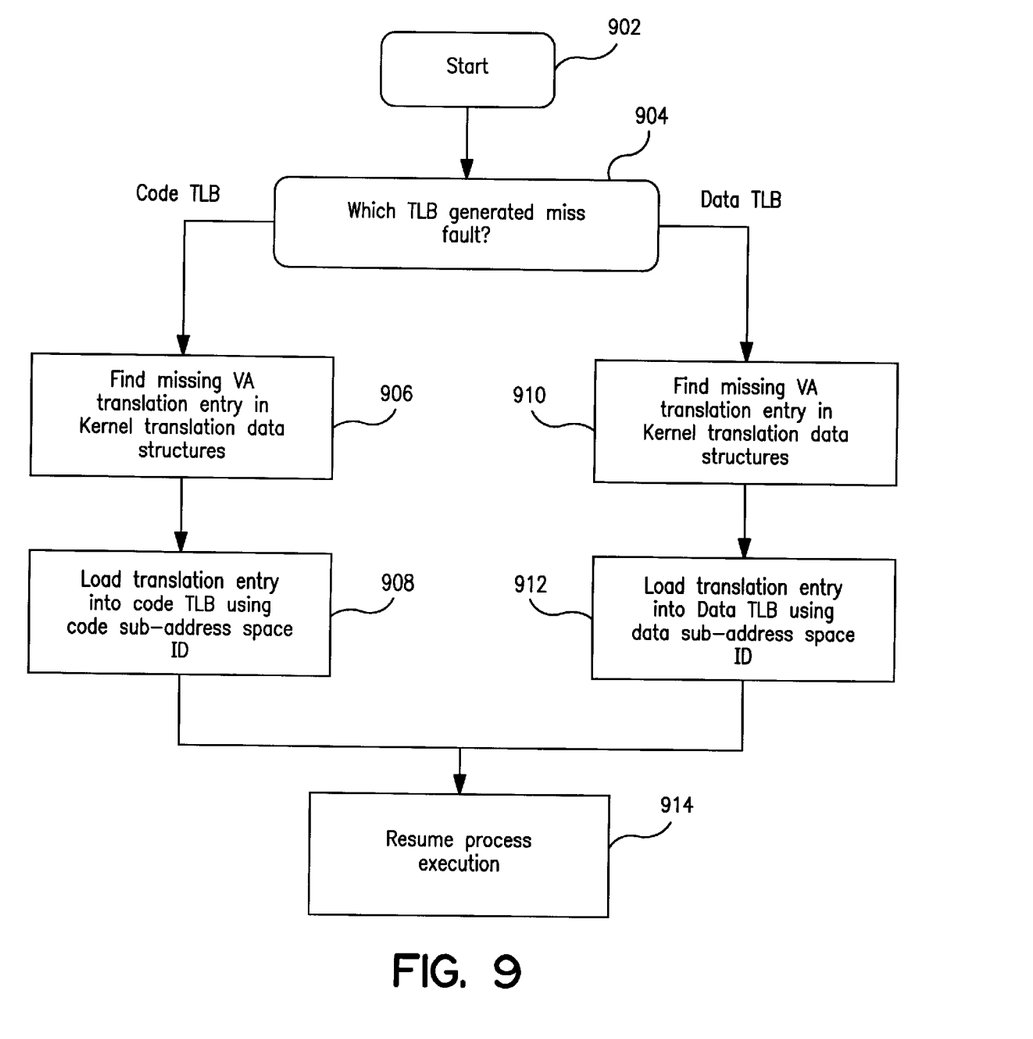
FIG. 9 illustrates a flowchart diagram for a translation miss handler method according to the present invention.

FIG. 9 illustrates a flowchart diagram for a translation miss handler method according to the present invention. The method starts at block 902 from where it passes to decision block 904 where the system determines which translation look-aside buffer (TLB), i.e., code translation look-aside buffer (CTLB) or data translation look-aside buffer generated the translation miss fault. If the code translation look-aside buffer did not have an entry including the current context identifier and the current virtual address then the process flows to block 906 where the system scans kernel translation data structures for an entry containing both the current virtual address and the current context identifier. The system then, at block 908, retrieves the translation entry including the current context identifier and the current virtual address and loads (updates) the CTLB with the current virtual address and the current code sub-address space context identifier. The method then passes to block 914 where process execution is resumed.

A similar sequence of steps takes place in the method according to the present invention if the data translation look-aside buffer generates a translation miss fault. The process passes at block 910 where the system scans the kernel translation data structures for an entry containing both the current virtual address and the current context identifier (either the current code or the current data context identifier). At block 912, the system retrieves the translation entry including the current data sub-address space context identifier and the current virtual address and loads (updates) the data translation look-aside buffer with that translation entry. The process then resumes execution at block 914.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A processor comprising:
   a processing unit for processing requests from at least one process, said at least one process having a code portion with at least one code segment, said at least one code segment having a first code context identifier, said process further having a data portion with at least one data segment having a first data context identifier;
   a code address translation look aside buffer (CTLB) for storing code address translations, the CTLB having at least one entry for storing a virtual address, said first code context identifier, and a physical address;
   a data storage device for storing data address translations;
   a code context register, coupled to said processing unit and to said CTLB, for storing a second code context identifier;
   a data context register, coupled to said processing unit and to said data storage device for storing a second data context identifier; and
   a code context comparing unit for comparing said first code context identifier with said second code context identifier and responsive to the comparison for generating a code context hit signal,
      wherein said CTLB includes a single entry for process segments having the same virtual address and the same process context identifier.

2. A computer system comprising:
   a bus;
   a memory device coupled to said bus; and
   a processor coupled to said bus said processor including
      a core unit for processing requests from at least one process, said process having a code portion with at least one code segment, said at least one code segment having a first code context identifier, said process further having a data portion with a first data context identifier;
      a code address translation look aside buffer (CTLB) for storing code address translations, the CTLB having at least one entry for storing a virtual address, said first code context identifier, and a physical address;
      a second storage device for storing data address translations;
      a code context register, coupled to said core unit and to said first storage device, for storing a second code context identifier;
      a data context register, coupled to said core unit and to said second storage device for storing a second data context identifier; and
      a code context comparing unit for comparing said first code context identifier with said second code context identifier and responsive to the comparison for generating a code context hit signal,
         wherein said CTLB includes a single entry for process segments having the same virtual address and the same process context identifier.

3. In a computer system including a processor having a code context register, a data context register, a code translation look aside buffer (CTLB), a data translation look aside buffer (DTLB), and a virtual address register, a computer-implemented method for sharing virtual address translation resources by a plurality of processes having code and data segments, the method comprising the steps of:
   mapping each of said processes code and data segments into an address space;
   allocating for each of said processes a data sub-address space context identifier;
   determining whether a first process can share code segments with other processes having a common code sub-address space context identifier;
   if said first process can share code segments with said other processes, assigning said first process said common code sub-address space context identifier; and
   if said process cannot share code segments with said other processes having a common code sub-address space context identifier, assigning said first process a unique code sub-address space context identifier.

4. The method of claim 3 further including the steps of
   loading a code context register with a current context identifier and loading a virtual register with a current virtual address; and
   determining whether said CTLB has an entry including said current context identifier and said current virtual address.

5. The method of claim 4 further including the step of
   finding a translation entry in a kernel translation data structure including said current code context identifier and said current virtual address, if said CTLB does not have an entry including said current context identifier and said current virtual address; and
   loading said translation entry in said CTLB.

6. A computer system comprising:
   a first process having a code segment with a first code context identifier and having a data segment with a first data context identifier;
   a second process having a code segment with a second code context identifier and having a data segment with a second data context identifier; and
   the first process and the second process have a common code context identifier when the first process and second process share a same text object.

* * * * *